United States Patent Office 3,400,612
Patented Sept. 10, 1968

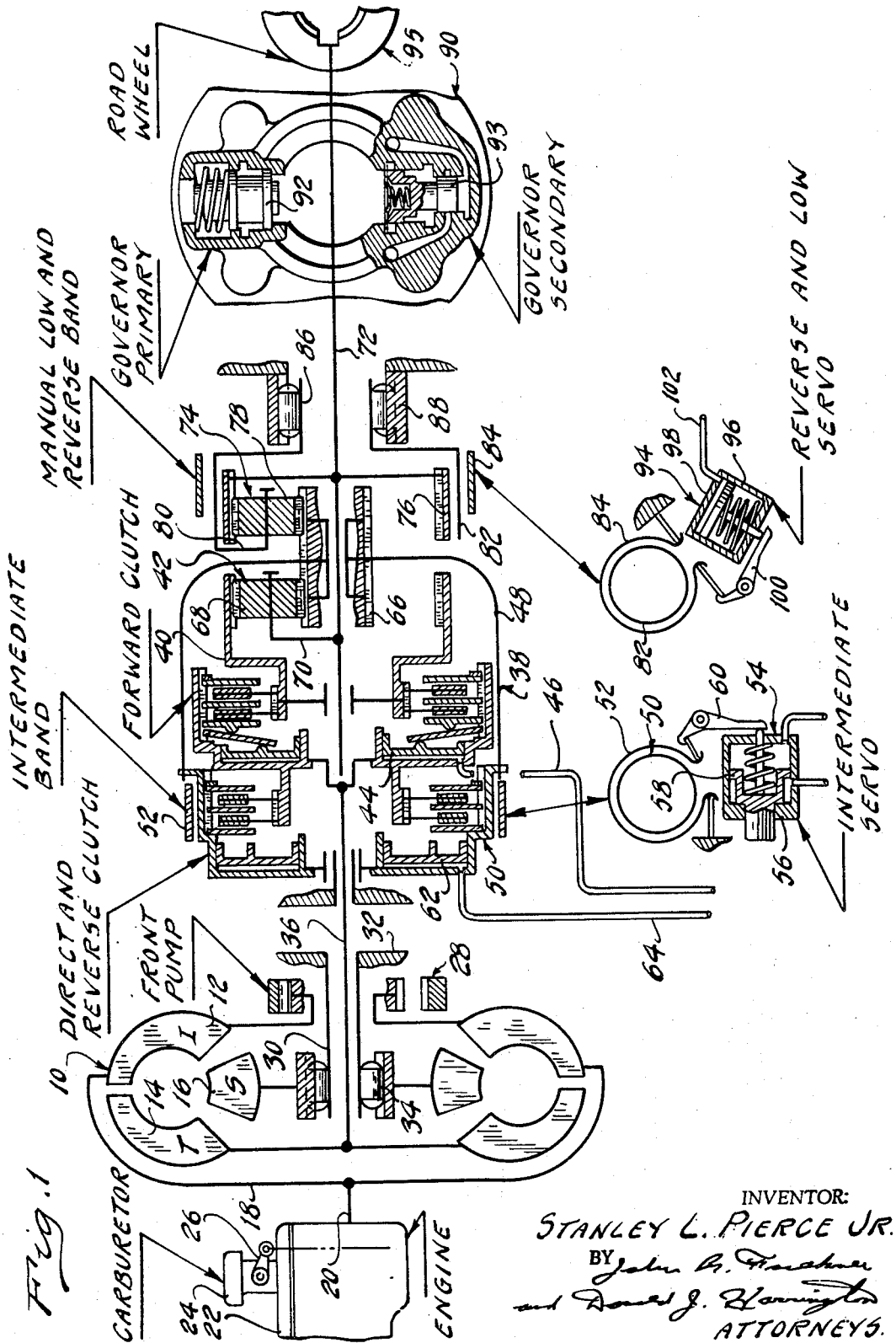

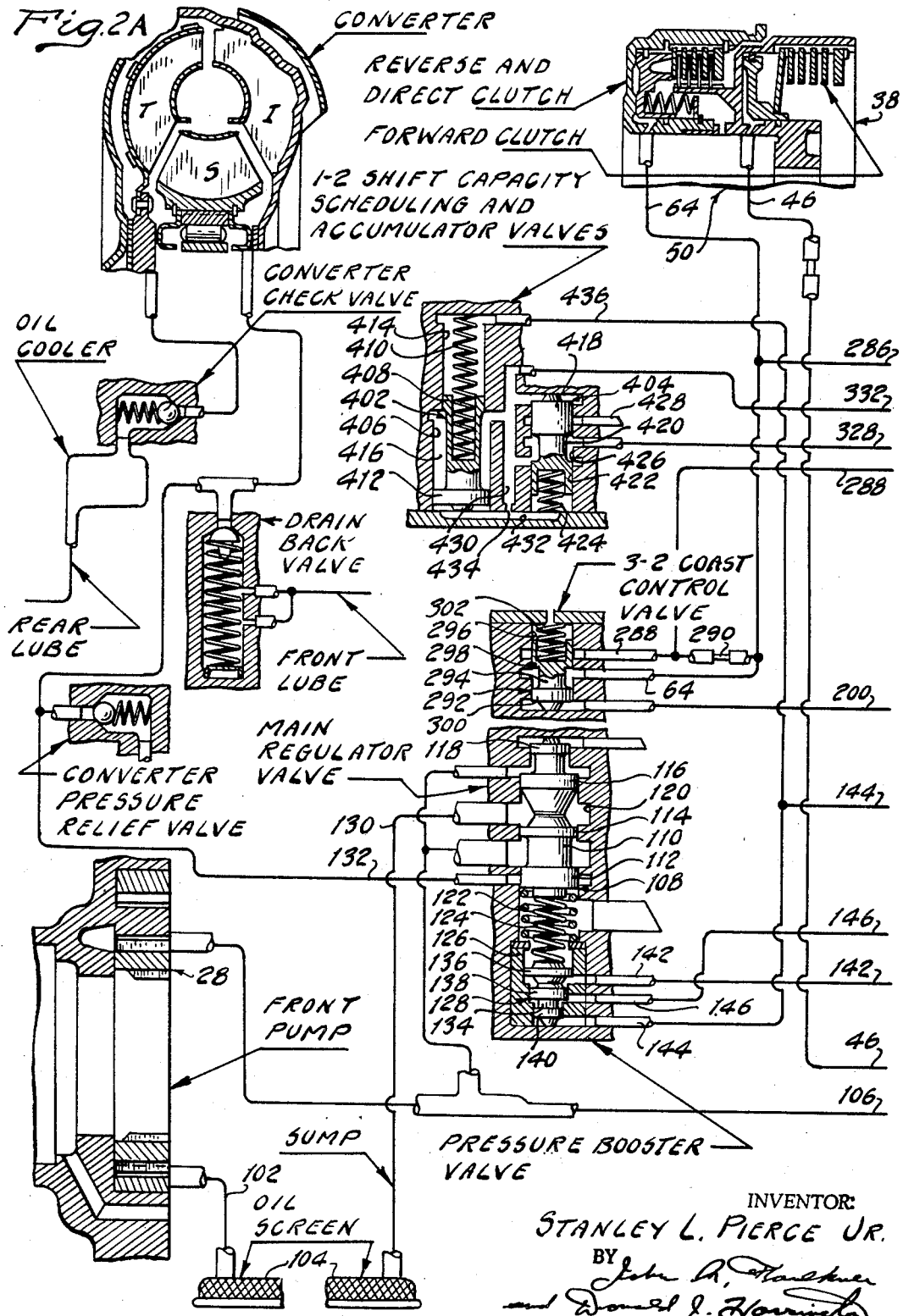

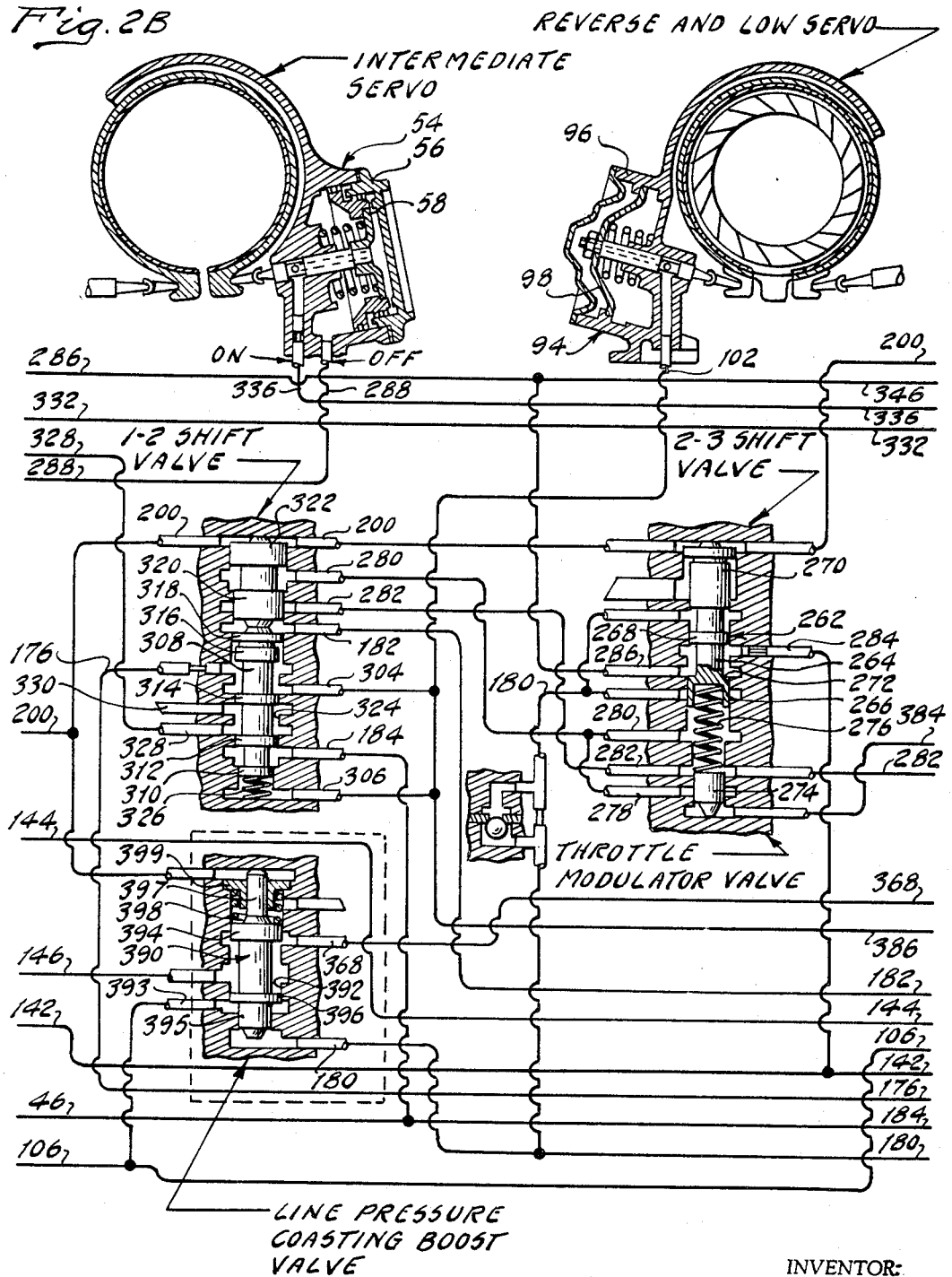

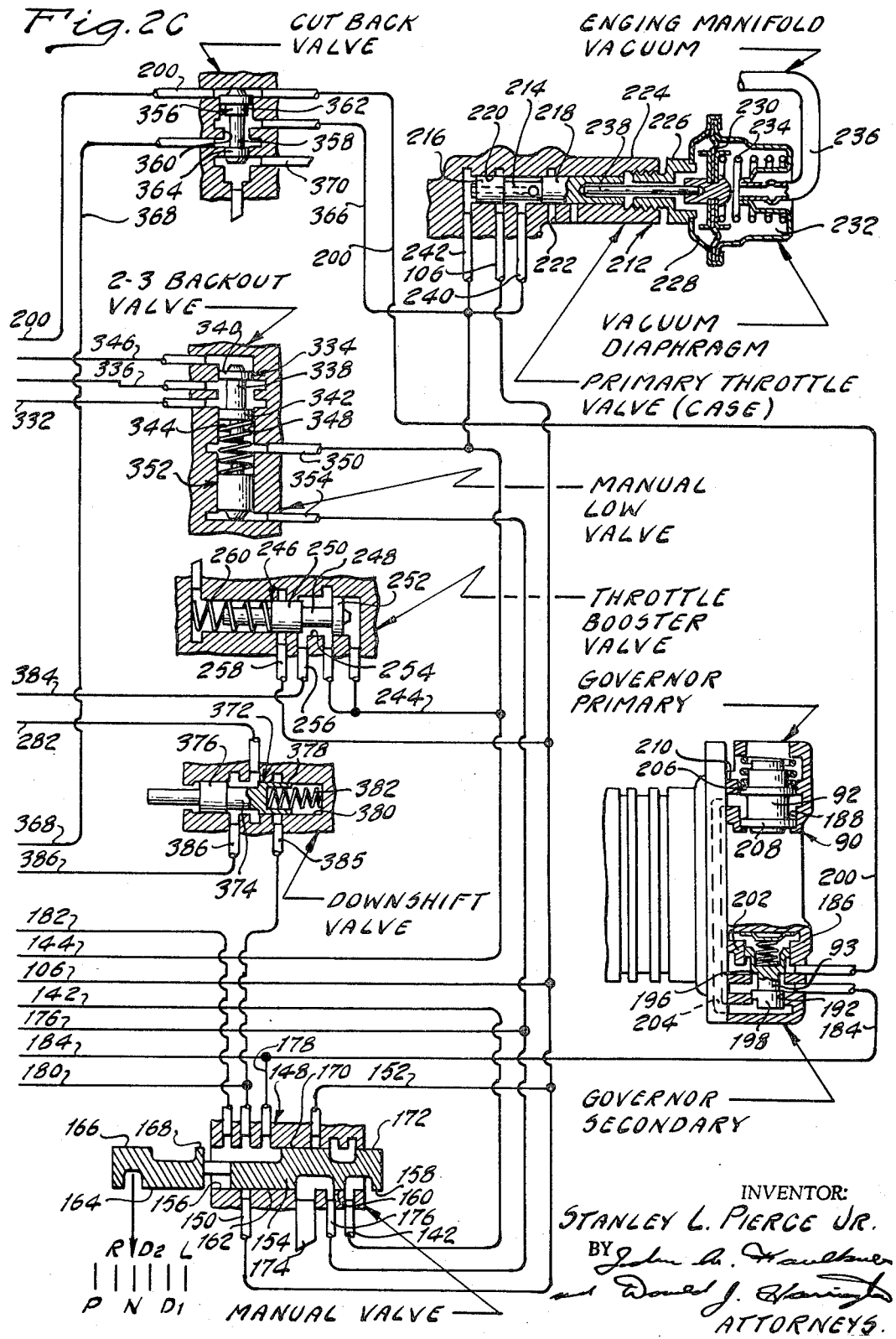

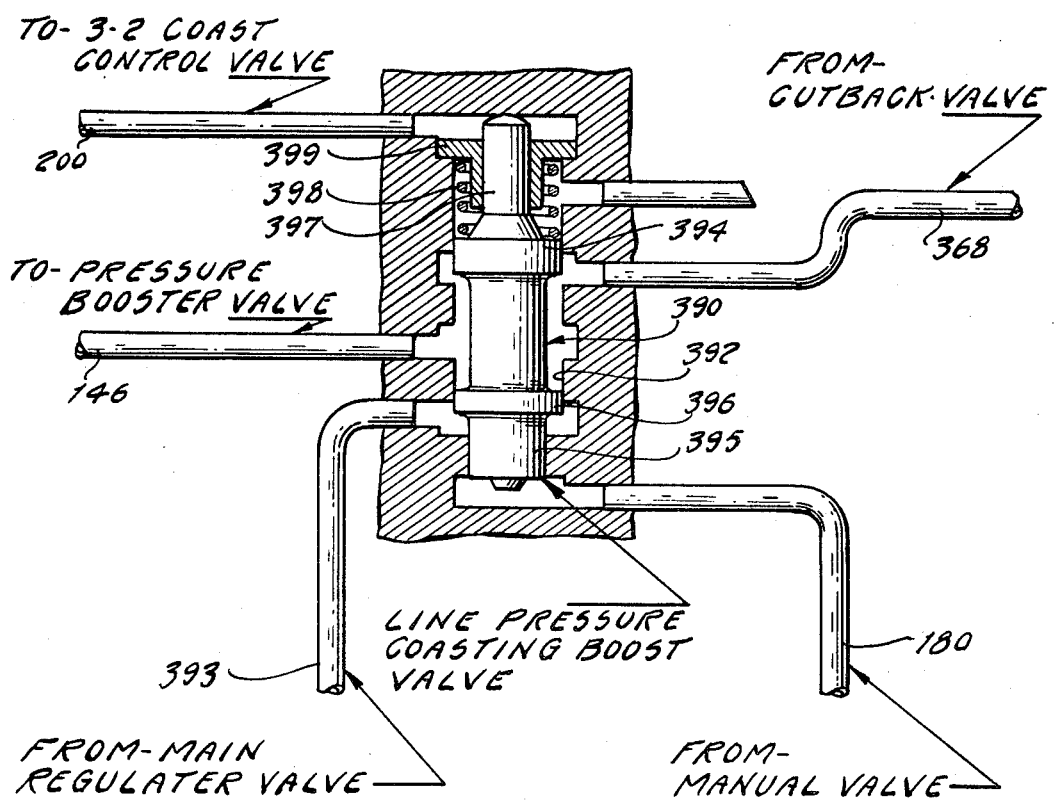

3,400,612
AUTOMATIC CONTROL VALVE SYSTEM FOR A MULTIPLE SPEED RATIO POWER TRANSMISSION MECHANISM HAVING A CONTROL PRESSURE BOOSTER
Stanley Leroy Pierce, Jr., Madison Heights, Mich., assignor to Ford Motor Company, Dearborn, Mich., a corporation of Delaware
Filed Jan. 5, 1966, Ser. No. 518,882
10 Claims. (Cl. 74—864)

ABSTRACT OF THE DISCLOSURE

A control valve circuit for a multiple-ratio power transmission system including a pressure regulator for maintaining a calibrated circuit pressure for any given driving condition and a control pressure coasting boost valve that communicates with the regulator and changes its calibration during coasting operation of the transmission system under zero driving torque, thereby augmenting the circuit pressure to accommodate the coasting torque delivery and delaying a forced downshift to the lowest speed ratio when the vehicle transmission is conditioned for coasting operation in the intermediate underdrive ratio.

My invention relates generally to multiple speed datio power transmission systems, and more particularly speed ratio power transmission systems, and more particularly to a conrtol valve circuit for controlling the operation of fluid pressure operated clutches and brakes in a transmission system.

GENERAL DESCRIPTION OF THE INVENTION

The structural features of my invention have been embodied in a multiple speed ratio power transmission system in an automotive vehicle driveline. The relative motion of the gear elements of the transmission system is controlled by pressure operated clutches and brakes. A positive displacement pump, which is driven by the vehicle engine, acts as a pressure source for the valve circuit of which my invention forms a part.

In several control valve circuits now used in the automotive industry there is included a pressure regulator valve arrangement that responds to changes in an engine torque signal to produce a regulated pressure in the valve circuitry that is related in magnitude to the engine torque. Conduit structure is provided in such valve circuits for conducting regulated pressure from the regulator valve arrangement to the fluid pressure operated servos for the clutches and brakes. Automatically operable shift valve assemblies are situated in and partly define the conduit structure.

The shift valve assemblies respond to a driven speed signal and to an engine torque signal to produce a desired shift sequence for the multiple speed ratio gearing. The regulator valve arrangement responds to changes in engine torque during a shift sequence to provide the desired torque transmitting capacity of the friction clutches and brakes. It does this by maintaining a regulated pressure in the associated clutch and brake servos that will be large enough to maintain adequate clutch and brake capacity of the friction elements of the system while at the same time avoiding an excessive pressure build-up that would result in an undesirable automatic shift pattern and undue harshness as the shift valves initiate torque ratio changes.

A manual valve in the valve circuit can be used by the vehicle operator to select the desired driving range. It is possible, by appropriately adjusting the manual valve, to select reverse drive or either of two forward drive ranges. Two automatic upshifts are available in one range and one automatic upshift is available in another. It is possible also to establish a so-called "manual low" forward drive condition for the transmission system by adjusting the manual valve to a low speed ratio position, which will cause the maximum underdrive servo to be engaged. The manual valve, when it is adjusted to the low position, will overrule the automatic upshifting tendencies of the shift valves.

It is desirable to employ the manual low drive condition whenever coast braking of the vehicle is desired. But since coasting usually occurs with a relaxed engine throttle, there exists a normal tendency for the regulator valve arrangement to effect a reduction in the regulated pressure level maintained in the system. If the vehicle is operating at a relatively high speed at the time the manual valve is shifted to the manual low position during coasting, it is possible that the resulting reduced line pressure will cause excessive slippage of the friction elements since the pressure made available under these conditions to the associated clutch and brake servos is insufficient to accommodate the vehicle coasting torque reaction. The line pressure may be sufficient to provide the necessary servo capacity during low speed coasting, but slippage normally would tend to occur when coasting occurs at high speed with the same servopressure.

It is an object of my invention, therefore, to overcome this shortcoming in control valve circuits of the type above-described by providing a booster valve assembly that will function to overrule the automatic pressure regulating tendencies for the regulator valve arrangement during high speed coasting operation.

It is a further object of my invention to provide a coasting boost valve assembly that is responsive to vehicle speed to provide a regulated pressure signal to the main regulator valve assembly. The magnitude of that signal is dependent upon the vehicle speed so that a maximum pressure boost is obtained at high speeds and a reduced pressure boost is obtained at lower speeds.

In an arrangement of this type provision must be made for avoiding an excessive load on the engine driven pump as the regulated pressure level is increased during high speed coasting. I accomplish this in my improved circuit by progressively reducing the magnitude of the pressure boost, as the vehicle speed becomes reduced upon continual coasting. The maximum braking torque occurs at the highest speed and the system must be calibrated to accommodate that torque. But by continuing the use of the higher pressure at low speeds, the pump would become overloaded and this in turn would tend to cause premature pump failure. The pressure signal regulating characteristic of my booster valve assembly avoids this shortcoming.

It is an object of my invention, accordingly, to provide a boost valve assembly that is capable of preserving the life of the positive displacement pressure source by imposing a pressure demand that reflects the actual coasting torque requirements regardless of the engine throttle position at which coasting takes place.

In the circuit disclosed herein, movement of the manual valve from a drive position to the manual low position while the vehicle is traveling at a relatively high speed will result in a down shift from a direct drive ratio to the intermediate speed ratio rather than to the low speed ratio. Initial vehicle braking then occurs with the gearing conditioned for intermediate ratio. After the vehicle speed falls below a predetermined value, a downshift occurs automatically to the low speed ratio. Thereafter, the transmission is conditioned for continuous operation in the low speed ratio.

It is possible, however, for the vehicle operator to effect a downstift from the intermediate speed ratio to the low speed ratio while the vehicle is traveling at a relatively high speed if he advances the engine throttle. This is due to the fact that an advance in the engine throttle position will result in an increased line pressure. Line pressure in turn acts upon a differential area on the shift valve that controls the ratio shifts from the intermediate speed ratio to the low speed ratio, and vice versa. It is undesirable for such a forced downshift to the low speed ratio to occur at a speed that is above a predetermined value since this would result in high inertia forces and cause an unpleasant lurching of the vehicle as the transmission system becomes conditioned to the lowest speed ratio.

It is an object of my invention, therefore, to provide a speed sensitive coasting boost valve assembly that is capable of modifying the regulated pressure level during coasting operation and which is capable also of eliminating normal downshift tendencies in the transmission system during coasting upon advancement of the engine carburetor throttle.

It is a further object of my invention to provide a coasting boost valve assembly of the type above set forth and which is adapted to respond to a control pressure signal that overrules this automatic operation when the manual selector valve is moved to a low drive range position.

It is a further object of my invention to provide a control system having a coasting boost valve assembly of the type above set forth which is sensitive to road speed when the transmission system is conditioned for a coast drive operation.

Further objects and features of my invention will become apparent from the following description from the accompanying drawings, wherein:

FIGURE 1 shows in schematic form a gearing arrangement capable of being used with my improved control system;

FIGURES 2a, 2b and 2c show in schematic form the valve elements of my improved control system, and;

FIGURE 3 shows an enlarged view of the coasting boost valve assembly which forms a part of the control valve system of FIGURES 2a, 2b and 2c. The coasting boost valve assembly is shown also in FIGURE 2b.

In FIGURE 1, numeral 10 designates a hydrokinetic torque converter unit which comprises an impeller 12, a turbine 14 and a stator 16. These converter members, which are bladed, are situated in toroidal, fluid flow relationship in a common torus circuit. Stator 16 changes the tangential component of the absolute fluid flow velocity vector of the fluid that leaves the turbine thereby creating a hydrokinetic torque reaction. This reaction is distributed to a portion of the housing 32 through an over-running coupling 34 and a stationary stator sleeve shaft 30. Coupling 34 inhibits rotation of the stator in a direction opposite to the direction of rotation of the turbine and the impeller, but freewheeling motion in the other direction is permitted when the converter acts as a fluid coupling.

The impeller 12 is connected by means of a drive shell 18 to the crankshaft 20 for an internal combustion vehicle engine 22. This engine includes an air-fuel intake manifold that is supplied with a combustible mixture by a carburetor 24. An engine carburetor throttle valve shown in part at 26 controls the flow of combustible mixture to the engine intake manifold.

A positive displacement fluid pump 28 is drivably connected to the impeller 18 and is effective to supply fluid pressure whenever the engine is operating. Pump 28 acts as a pressure source for the control system that will be described with reference of FIGURES 2a, 2b, 2c, 3 and 5.

The turbine 14 is connected to a turbine shaft 36 which in turn may be connected to a ring gear 40 for a first simple planetary gear unit 42. A selectively engageable forward clutch 38 is provided for the purpose of establishing and interrupting a connection between shaft 36 and ring gear 40. Forward clutch 38 includes an internally splined clutch drum that defines an annular cylinder within which an annular piston 44 is situated. This annular piston and the annular cylinder cooperate to define a pressure cavity that is supplied with actuating fluid pressure by means of a feed passage 46. A drive shell 48 is connected to a clutch drum for a direct and reverse clutch 50.

A brake band 52 surrounding the drum may be applied and released selectively by means of an intermediate servo shown in FIGURE 1 at 54. The servo includes a cylinder that receives a piston 58. The cylinder and the piston cooperate to define a pair of opposed fluid pressure chambers that may be supplied with actuating fluid by means of separate pressure feed passages as will be seen in the subsequent description. The pressure force acting upon piston 58 is transferred to the operating end of brake band 52 by means of a motion transmitting brake lever 60. The other end of the brake band 52 is anchored in a conventional fashion.

The drum for the direct and reverse clutch 50 defines an annular cylinder within which is received an annular piston 62. This piston and its cooperating cylinder define a working chamber that is supplied with fluid by means of a pressure feed passage 64.

A simple planetary gear unit 42 includes also a sun gear 66 which meshes with a set of planet pinions 68. These pinions are rotatably carried by a carrier 70 which is connected directly to a power output shaft 72.

Sun gear 66 forms also a part of a second simple planetary gear unit 74. This gear unit includes also a ring gear 76 and a set of planet pinions 78, the latter being journalled rotatably upon a carrier 80. Carrier 80, which defines a brake drum 82 about which is positioned a manual low and reverse brake band 84, can be adapted for accommodating driving torque reaction by means of an over-running coupling having brake rollers 86. These rollers are disposed between an inner race that is common to the carrier 80, and the outer race 88, the latter being cammed to provide cam surfaces that cooperate with the rollers 86 to inhibit rotation of the carrier 80 in one direction although freewheeling motion of the carrier 80 in the opposite direction is permitted. Race 88 is secured fast to the transmission housing.

A fluid pressure governor valve assembly 90 is drivably carried by power output shaft 72. It includes a primary governor valve 92 and a secondary governor valve 93, each valve being situated on opposed sides of the axis of rotation of the shaft 72. As will be explained subsequently, the primary governor valve inhibits the modulating action of the secondary governor valve at speeds of rotation of the shaft 72 that are less than a predetermined value. At any speed greater than that predetermined value, the secondary governor valve is effective to establish a pressure signal that is proportional in magnitude to the speed of rotation of the shaft 72. The signal may be utilized by the automatic control valve system that will be described subsequently.

Shaft 72 can be connected to the vehicle road wheels 95 through a driveshaft and differential and axle assembly.

Brake band 84 is applied and released by means of a fluid pressure operated servo 94. The servo includes a cylinder 96 within which is positioned a fluid pressure operated piston 98. Cylinder 96 and piston 98 define a pressure chamber that can be supplied with control pressure through a feed passage 102. The fluid pressure force acting upon the piston 98 is transferred to the operating end of the brake band 84 by means of a brake operating lever shown in part at 100. The other end of the brake band 84 is anchored to the housing as indicated.

The transmission mechanism may be conditioned for continuous operation in the lowest speed-ratio by appropriately adjusting a manual valve to the low speed-ratio position as will be explained subsequently. This causes fluid pressure to be distributed to the pressure chamber for the reverse and low servo. The forward clutch 38 is applied during operation in the forward drive range in any speed-ratio. If both the brake band 84 and the clutch 38 are applied, the turbine torque delivered to the turbine shaft 36 is distributed through the engaged forward clutch 38 to ring gear 40. The driven shaft 72 to which the carriers 70 and 80 are connected tends to resist rotation. Thus, there is a tendency for sun gear 66 to rotate in a direction opposite to the direction of rotation of shaft 36. This, then, tends to cause carrier 80 to rotate in the same direction as the direction of rotation of sun gear 66. It is inhibited from doing so, however, both by the overruning brake shown in part at 86 and also by the engaged brake band 84. The torque acting on the ring gear 76 then is in a forward driving direction. It supplements the driving torque of the carrier 70 so that a split torque delivery path is provided between the shaft 36 and the shaft 72.

Drive shell 48 which is connected directly to the sun gear 66 can be braked by applying the intermediate servo, thus establishing intermediate speed-ratio operation. Under these conditions, the brake band 84 is released while the clutch 38 remains applied. Clutch 50, of course, is released. The sun gear 66 functions as a reaction member during such intermediate speed-ratio operation, and the driving torque delivered to the ring gear 40 is multiplied by the first planetary gear unit 42. The over-all speed-ratio then is greater than the lowest speed ratio, but it is less than unity. The overrunning coupling shown in part at 86 freewheels during such a speed-ratio change from the lowest speed-ratio to the intermediate speed-ratio.

To condition the mechanism for operation in the lowest speed-ratio during normal acceleration from a standing start, it is not necessary to apply brake band 84.

The overrunning brake shown in part at 86 accommodates the forward acting torque, and upon application of the intermediate speed-ratio brake band 52 an automatic pick-up shift from the lowest speed-ratio to the highest speed-ratio is obtained. This is accomplished by the engagement of a single friction torque establishing device without the necessity for engaging or releasing a second friction torque establishing device.

A speed-ratio change from the intermediate speed-ratio to the direct drive, high speed-ratio is accomplished by releasing brake band 52 and applying both clutches 38 and 50 simultaneously. Brake band 52 is released by distributing pressure to the right-hand side of the piston 58. The brake band 52 is released when both pressure chambers of the intermediate servo are pressurized.

It will be seen, therefore, that the elements of the gear units will be caused to rotate in unison when both clutches are applied. A direct drive connection between shafts 36 and 72 then is provided.

Automatic speed-ratio changes can be accomplished in order to condition the driveline for various road conditions and for various operating demands. This is done by means of the automatic control valve system that now will be described.

This disclosure contains several valve elements that are common to copending application Ser. No. 401,356 (John J. Searles), now Patent No. 3,344,681, which is assigned to the assignee of my instant invention. Reference may be had to that copending application for purposes of supplementing this disclosure. Only a brief description of the valve elements that are common to the related copending Searles disclosure will be presented as part of this disclosure.

In FIGURE 2a, the engine driven front pump 28 receives its supply of oil through a supply passage 102, which communicates with the transmission sump that may be defined by the lower region of the transmission housing, and oil screen 104 is located in the sump at the intake end of the passage 102.

The high pressure side of the pump 28 communicates with the main line pressure passage 106.

A main regulator valve 108 maintains a controlled pressure level in the passage 106. It includes a movable valve element 110 having spaced valve lands 112, 114, 116 and 118. These lands are adapted to register with internal valve lands formed in a valve bore 120 which receives the valve element 110. The portion of the chamber 120 at the upper end of the land 118 is exhausted. Line pressure from passage 106 is distributed to the differential area defined by lands 118 and 116, thereby creating a pressure force by lands 118 and 116, thereby creating a pressure force that is opposed by the force of valve springs 122 and 124. Spring 122 is seated on the valve insert 126, which forms a part of a pressure booster valve 128. The region of the chamber 120 that is occupied by the springs 122 and 124 is exhausted as indicated.

As pressure in passage 106 begins to be developed when the pump 128 becomes operative, valve element 110 is urged in a downward direction to provide controlled communication between passage 106 and a low pressure oil return passage 130. Before land 114 uncovers the passage 130, however, land 112 uncovers converter fluid supply passage 132. Thus, the converter is filled during the initial stages of the pressure build-up in the control system. Once the land 114 establishes communication between passage 106 and passage 130, however, the element 110 begins to regulate the pressure in passage 106.

The pressure booster valve comprises a valve element 134 which has spaced valve lands 136, 138, and 140, each land being formed with a progressively decreasing diameter. The differential area defined by lands 136 and 138 communicates with a passage 142 which is pressurized, as will be explained subsequently, whenever the transmission mechanism is conditioned for reverse drive operation. The resulting pressure force acting on the element 134 thus augments the force of the valve springs for the main regulator valve to cause the main regulator valve to maintain a higher pressure level in the circuit than the corresponding pressure level that would exist during forward drive operation. The servos which must accommodate the increased driving torque under reverse driving conditions thus can be maintained at the proper pressure level to avoid slippage of the clutch and brake friction elements.

The lower area of land 140 is in communication with passage 144, which is subjected to an engine torque sensitive signal pressure during normal operation. The resulting pressure force acting upon the pressure booster valve supplements the spring force after the magnitude of the signal pressure reaches a predetermined value. After that value is reached the regulated line pressure maintained by the main regulator valve will be dependent upon engine torque, and for any magnitude of the signal pressure less than that predetermined value the pressure force acting upon the pressure booster valve will be insufficient to overcome the force of spring 124. The spring 124 yields, however, when the magnitude of the signal pressure in passage 144 exceeds the predetermined value.

A cut-back pressure passage 146 communicates with the differential area of lands 138 and 140. Passage 146 communicates with a so-called cut-back valve, which will be described subsequently, and it in turn communicates with the engine torque signal pressure source. The cut-back valve is road-speed sensitive, and at any road-speed less than a predetermined value, the cut-back valve causes passage 146 to become pressurized with the torque sensitive signal pressure.

Thus during acceleration from a standing start when the hydrokinetic torque ratio of the converter is at a maximum value, the available line pressure for any given engine throttle setting will be at a maximum value.

The regulated line pressure in passage 106 is distributed to the manual valve 148 through branch passages 150 and 152. The manual valve includes a movable valve element 154 which may be connected by means of a suitable linkage mechanism to a driven controlled selector lever. It is slidably situated within a valve chamber 156, which has formed thereon valve lands that register with cooperating valve lands on the element 154. These valve lands are identified by reference numerals 158, 160, 162, 164, 166, 168, 170 and 172. The space between lands 162 and 164 is in fluid communication with the space between lands 170 and 168.

An exhaust port 174 communicates with the valve chamber 156. Each end of the valve chamber 156 also forms an exhaust port.

The valve element 154 can be adjusted by the operator to any one of several operating positions. These are indicated by the symbols R, N, D2, D1 and L, which respectively identify the reverse position, the neutral position, the second drive range position, the first drive range position and the manual low drive position. Element 154 is shown in the drawings in the neutral position.

Fluid pressure is distributed by the manual valve to various regions of the control system through communicating passages 150, 152, 142, 176, 178, 180 and 182. Passage 178 communicates with a passage 184, which distributes line pressure to the secondary governor valve 93 of the governor valve assembly 90. Passage 184 also communicates directly with the forward clutch 38.

Passage 180 communicates with the 2–3 shift valve that will be described subsequently. It acts as a feed passage for the 2–3 shift valve. Passage 182 extends to the 1–2 shift valve and distributes to it a pressure that disables the 1–2 shift valve when operation on the D2 driving range is desired.

When the manual valve element 154 is shifted to the reverse drive position R, passages 178, 180 and 182 are exhausted through the left-hand end of the manual valve chamber 156 and passage 150 becomes blocked by land 162. Passage 152 is brought into communication with passage 176 through the space between lands 170 and 172 and the annulus formed at the location at which passage 176 communicates with the chamber 156. Passage 142 also becomes pressurized, as indicated earlier, since it is brought into communication with passage 176 through the space between lands 158 and 160.

When the manual valve element 154 is shifted to the D2 position, passage 150, which is subjected to line pressure, is brought into communication with passages 178, 180 and 182. Passages 176 and 142 become exhausted through exhaust port 174. Passage 152 becomes blocked by land 170. Passages 176 and 142 also become exhausted through the right-hand end of the valve chamber 156.

When the manual valve element 154 is shifted to the D1 position, passage 182 becomes exhausted through the left-hand end of the manual valve chamber 156. Passages 178 and 180 communicate with line pressure passages 150 and 152. Passages 142 and 176 become exhausted through the right-hand end of the manual valve chamber 156.

When the manual valve element 154 is shifted to the L position, both passages 180 and 182 become exhausted through the left-hand end of the valve chamber 156. Passage 152 communicates with passage 178 and also with passage 176. Passage 142 becomes exhausted through the right-hand end of the valve chamber 156.

The governor valve assembly 90, which acts as a vehicle speed sensitive pressure source, includes a valve body 186 which is carried by the power output shaft 72. It includes a pair of valve chambers situated on opposed sides of the shaft 72. One chamber 188 receives a primary governor valve element 92 and a second chamber 192 receives a governor valve element 93. This valve element 93 is formed with stepped diameter valve lands 196 and 198. Line pressure is distributed to the annular space between lands 198 and 196 thereby creating a pressure force on element 93 that tends to urge it radially inwardly.

When this occurs, a governor pressure passage 200, which extends to speed sensitive portions of the valve system, is brought into communication with an exhaust port 202 formed in the valve body. At the same time, passage 184 is brought into communication with a cross-over passage 204 formed in the governor valve body 186. Land 198 is provided with a suitable flat to provide such communication when the element 93 is shifted radially inwardly.

Passage 204 communicates with the annular space between the valve lands 206 and 208 formed on the primary governor valve element 92. These lands, when the element 92 assumes the radially inward position shown, block communication between passage 204 and the exhaust region. Therefore, whenever the speed of shaft 72 is less than that speed that will cause the primary governor valve element to shift outwardly, the pressure signal in passage 200 will be zero. Modulation of pressure by the secondary governor valve element 93 will be prevented. At some predetermined speed, however, the spring force acting upon the primary governor valve element 92 will yield thereby allowing the element 92 to shift radially outwardly to establish communication between passages 204 and an exhaust port 210 formed in the valve body 186. When this occurs the pressure acting radially inwardly on the valve land 198 becomes exhausted thereby allowing the secondary governor valve element to modulate the pressure in passage 184 to produce a resultant pressure signal in passage 200. The magnitude of this signal is proportional to the speed of rotation of the shaft 72.

The engine torque sensitive pressure signal is obtained by a primary throttle valve shown at 212. It includes a valve element 214 having a pair of spaced lands 216 and 218. Element 214 is slidably disposed in throttle valve chamber 220. Control pressure is distributed to the valve chamber 220 through the passage 106. An exhaust port 222 communicates with the chamber 220 at a location adjacent land 218.

Chamber 220 is formed in a valve body 224 which is threaded at its end to accommodate a threaded vacuum diaphragm adapter 226. A vacuum servo housing, shown in part at 228, is secured to the adapter 226. The housing is secured to the margin of the flexible diaphragm 230, which cooperate with the housing to define a manifold pressure chamber 232. A diaphragm spring 234 which acts on the flexible diaphragm 230 is anchored against the housing 228. The chamber 232 is in communication with the air fuel mixture intake manifold of the internal combustion engine for the vehicle driveline. The manifold pressure passage 236 interconnects the chamber 232 with the engine manifold.

The left-hand side of the diaphragm 230 is subjected to atmospheric pressure. Thus the pressure forces are unbalanced, and the force of spring 234 causes the diaphragm 230 to deflect. The force acting on the diaphragm is transmitted to the valve element 214 through a valve stem 238.

The throttle valve output pressure passage 240 intersects the chamber 220 at a location intermediate the lands 216 and 218. A feed-back pressure passage 242 interconnects passage 240 and the left-hand end of land 216. Thus it is apparent that the valve element 214 will modulate the pressure in passage 106 and produce a resultant pressure signal in passage 240 that is determined by the magnitude of the engine manifold pressure.

The throttle pressure signal in passage 240 is made available to passage 144, as explained previously, thereby providing a modification in the regulated line pressure that satisfies changing torque transmitting requirements as the engine intake manifold pressure changes. The throttle pressure in passage 240 is distributed also through a branch passage 244 to a throttle booster valve 246. That valve comprises a valve spool 248 having spaced lands 250 and 252.

Valve spool 248 is situated in a valve chamber 254 which has internal valve lands that register with the lands 250 and 252. A throttle pressure passage 256 intersects the chamber 254 at a location intermediate lands 250 and 252. Passage 244 intersects chamber 254 at a location adjacent land 252. It communicates also with the right-hand end of the land 252. Land 250 is smaller in diameter than land 252.

Line pressure from passage 106 is distributed through passage 258 to the valve chamber 254. Passage 258 intersects the chamber 254 at a location adjacent land 250. Valve element 248 is biased in a right-hand direction, as viewed in the drawings, by a valve spring 260.

The pressure in passage 244 will create a pressure force that tends to urge the valve element 248 in a left-hand direction. If that pressure force is insufficient to overcome the force of spring 260, direct communication is established between passage 244 and passage 256. If the pressure in passage 244 is greater than the pressure corresponding to that engine manifold pressure obtained for any given load when the engine carburetor throttle is at a medium setting, the spring 260 will begin to yield and the valve element 248 will begin to modulate the pressure in passage 258. As the pressure in passage 244 increases still further, the magnitude of the resultant pressure in passage 256 will be increased accordingly. The magnitude of the pressure in passage 256 therefore is an indicator of the engine torque demand as indicated by the engine throttle setting. Although the pressure in passage 144 will vary only slightly as the engine carburetor throttle is advanced from an intermediate setting toward a wide-open throttle position, the magnitude of the pressure in passage 256 will tend to vary to a significant and measurable degree. Thus the pressure in passage 256, unlike the pressure in passage 144, can be used as an indicator of engine torque demand. The pressure in passage 144, however, is useful as an indicator of engine torque as distinguished from torque demand. It is for this reason that passage 144 is used to distribute a torque sensitive signal to the regulator valve. Passage 256 on the other hand, extends to the 2–3 shift valve and 1–2 shift valve, each of which will be explained subsequently, for the purpose of establishing the shift points and providing the necessary shift delay during upshifts as the vehicle is accelerated.

Passage 256, as indicated previously, extends to the 2–3 shift valve 262 which includes a multiple land valve element 264 having spaced valve lands 266, 268 and 270.

Valve member 264 is slidably positioned within a valve chamber 272 having internal valve lands that cooperate with the lands of element 264. At the lower end of chamber 272 there is provided a throttle modulator valve 274 in the form of a single diameter valve element that registers with internal valve lands formed in the lower region of chamber 272. A valve spring 276 is situated between modulator valve 274 and valve element 264.

Passage 256 distributes throttle booster valve output pressure to the lower end of valve 274. When a minimum limiting pressure is obtained, spring 276 yields thereby establishing restricted communication between passage 256 and passage 278. The modulated pressure thus established in passage 278 is of lower magnitude than the pressure in passage 256.

This modulated pressure is distributed to the chamber 272 through feed-back passage 280.

A passage 282, which is exhausted during normal forward drive operation, communicates with the chamber 272 at a location adjacent the upper edge of valve 274.

The governor pressure passage 200 extends to the upper region of chamber 272 and distributes governor pressure to the upper surface of land 270. Thus a governor pressure force opposes the modulated throttle valve pressure force and the spring force acting upon the element 264.

Line pressure is distributed from passage 180 to the valve chamber 272 at a location adjacent land 266 and also at a location intermediate lands 270 and 268. Land 268 is slightly smaller in diameter than the land 270.

Thus when the valve element 264 assumes the position shown, a slight hysteresis force acts upon element 264 to help maintain it in the upper position shown. This force is cancelled, however, when the element 264 moves in a downward direction since land 270 then blocks passage 180 at a location adjacent land 270. Passage 282, which is exhausted during operation in any of the forward drive ranges, communicates with the chamber 272 at a location intermediate lands 266 and 268. When the valve element 264 assumes the position shown, direct communication is established between passage 284 and servofeed passage 286. Passage 180 is pressurized whenever the manual valve assumes the D2 position or the D1 position.

If the vehicle speed reaches a sufficiently high value for any given engine manifold pressure, the valve element 264 will shift downwardly thereby causing communication between the passage 180 and the passage 286. This communication takes place between the space defined by lands 264 and 266. At the same time passage 284 exhausts the differential area defined by lands 260 and 270. Communication between passage 286 and exhaust passage 284, of course, is interrupted. The transmission then is conditioned for an upshift from the intermediate speed-ratio to the direct drive, high speed-ratio as pressure is distributed through passage 286 to the reverse and direct clutch servo.

Passage 286 communicates with passage 64 to pressurize the reverse and direct clutch servo. The pressure in passage 286 is distributed also to an intermediate servo-release pressure passage 288, which in turn extends to the release side of the intermediate brake band servo. The intermediate brake band servopiston thus moves to a brake releasing position notwithstanding the fact that the apply side of the intermediate servo is pressurized at this time.

Communication between passage 288 and passage 286 is established by means of a flow restricting orifice 290 and by a 3–2 coast control valve 292. The 3–2 coast control valve includes a valve element 294 situated within the valve chamber 296. It is formed with two valve lands 298 and 300. A valve spring 302 normally urges the element 294 in a downward position, as viewed in the drawings. The governor pressure from passage 200 acts upon the lower end of land 300. When the vehicle speed is sufficiently high, the governor pressure is effective to maintain free communication between passages 288 and 286. Thus the 3–2 coast control valve has no influence on the rate of application of the intermediate speed brake at these higher vehicle speeds. If the vehicle speed is low, however, the spring 302 will urge the valve element 294 in a downward direction. In this case the restricted passage 290 provides the only fluid communication between passages 288 and 286. A downshift from the high speed range to low speed range thus is characterized by reduced rate of application of the intermediate speed-ratio brake band. During coasting operation the transmission normally will tend to assume a downshift condition, but the application of the intermediate brake band is delayed and cushioned under these conditions to prevent an undesirable harshness.

Passage 176 is pressurized only when the manual valve assumes the L position or the R position. Under these conditions the pressure is distributed through the 1–2 shift valve to a passage 304, which in turn communicates with a low speed brake servofeed passage 306.

The 1–2 shift valve comprises a valve spool 308 having spaced valve lands 310, 312, 314, 316, 318, 320 and 322. Lands 320 and 322 are located on the valve element portion that is separated from the portion on which lands 312, 314, 316 and 318 are formed. The region between the two valve element portions is in communication with passage 182 which is pressurized, as mentioned earlier, when the manual valve assumes the D2 position. If for any reason the manual valve is miscalibrated or if the valve tolerances are such that leakage will occur across the valve lands between passages 180 and 182 when the driver has shifted the manual valve to the D1 position, the resulting pressure build-up in passage 182 will cause the lower portion of the valve element 308 to separate from the upper portion thereof thereby causing the lower portion of the valve element 308 to assume the intermediate speed-ratio position. Thus full line pressure can be applied to the intermediate servo to establish definitely the intermediate speed-ratio condition. Partial application of the intermediate servo is avoided.

Passage 184, which pressurizes the forward clutch 38, communicates with the valve chamber 324 within which the 1–2 shift valve element 308 is situated. Chamber 324 is formed with internal valve lands that register with the lands 312, 314, 316, 318, 320 and 322. Communication between chamber 324 and passage 184 takes place adjacent land 312. This land is slightly larger in diameter than land 310.

Element 308 is biased in an upward direction by a valve spring 326. The lower end of the chamber 324 is exhausted except when the manual valve is moved to the reverse or low positions. When the element 308 assumes the position shown, passages 304 and 306 are exhausted through passage 176 and through the exhaust opening in the manual valve.

The line pressure in passage 184 acts upon the differential area of lands 310 and 312 when the element 308 assumes the position shown thereby tending to hold it in that position. When the governor pressure for any given manifold pressure exceeds a predetermined amount, valve element 308 will be shifted in a downward direction thereby establishing communication between passage 184 and a passage 328, which communicates with the valve chamber 324 at a location intermediate lands 312 and 314. Land 314 covers an exhaust port 330 upon downward movement of the element 308. The exhaust port 330 is located adjacent land 314 and it is in communication with passage 328 when the element 308 is in the position shown. When the element 308 moves downwardly, however, passage 304 communicates with exhaust port 330 as land 316 blocks passage 176.

When passage 328 becomes pressurized upon movement of element 308 in a downward direction, pressure is distributed through the 1–2 shift capacity scheduling and accumulator valves, shown in FIGURE 3, to a passage 332. This passage in turn extends to a 2–3 backout valve 334. The latter establishes communication between passage 332 and a passage 336, which extends to the apply side of the intermediate servo.

During acceleration from a standing start the driving torque reaction is accommodated by the overrunning couplings shown in part at 86. After a predetermined vehicle speed is reached for any given manifold pressure, the 1–2 shift valve will move to the upshift position thereby causing pressure distribution to occur from passage 184 to passage 328. This applies the intermediate servo. This action occurs, of course, only when the manual valve is in the D1 position. If the manual valve is moved to the D2 position, passage 182 becomes pressurized immediately thereby causing the valve element 308 to move to the intermediate speed-ratio position. The vehicle then accelerates from a standing start in the intermediate speed-ratio. Upon a subsequent upshift to the high speed-ratio as the vehicle continues to accelerate, the 2–3 shift valve will move thereby causing pressure distribution to occur between passage 180 and passage 286, as explained previously. The release side of the intermediate servo becomes pressurized simultaneously with the application of the reverse and direct clutch.

The 2–3 backout valve cushions the application of the reverse and direct clutch when an upshift occurs under minmum engine throttle conditions. Normal application of the reverse and direct clutch upon a 2–3 upshift during the acceleration period, the 2–3 backout valve provides continuous communication between passages 332 and 336.

The backout valve includes a valve spool 338 having spaced valve lands 340 and 342. It is biased in an upward direction as seen in the drawings by valve spring 344. The upper end of land 340 is subjected to the pressure that exists in the reverse and direct clutch, a suitable passage 346 being provided for this purpose. Valve element 338 is slidably situated within a backout valve chamber 348. The portion of this chamber that is occupied by spring 344 communicates by means of passage 350 with the throttle pressure line 240. During a normal 2–3 upshift as the vehicle accelerates under torque, the throttle pressure force and the spring force are sufficient to maintain the valve element 338 in the position shown until the reverse and direct clutch becomes fully engaged and the intermediate servo becomes fully released. If the 2–3 shift occurs, however, when the engine manifold pressure is low—for example, during closed throttle, coasting conditions—the pressure build-up in the reverse and direct clutch following an upshift of the 2–3 shift valve causes the valve element 338 to shift downwardly at a time prior to the time that the so-called end-point of the servo is reached.

Initial pressure build-up in the reverse and drive clutch will cause element 338 to shift in a downward direction thereby establishing communication between the passage 346 and the passage 336. Thus the 2–3 backout valve connects the reverse and drive clutch servochamber with the apply side of the intermediate servo. This allows the servo endpoint to be reached at a time prior to the finial engagement of the reverse and drive clutch. This eliminates simultaneous application of the servo and the clutch, and hence it eliminates the harshness of the 2–3 upshift under such minimum torque conditions.

Since it is essential to prevent loss of pressure from the reverse and drive clutch through the backout valve when the transmission mechanism is conditioned for low speed operation, the manual low valve 352 is provided. This valve comprises a single diameter valve element that is moved into engagement with the 2–3 backout valve element 338 whenever passage 354 is pressurized.

This passage is pressurized whenever the manual valve is moved to the low speed range position. If the manual valve is moved into the low speed range position while the element 338 is in a downward position, the end-point at which a coasting 3–2 downshift would occur would be dependent upon the calibration of a 2–3 back-out valve. A delay in the application of the intermediate servo then would be undesirable. The manual low valve prevents this from happening.

A cut-back valve 356 is provided to allow the line pressure to be reduced following initial acceleration from a standing start when the hydrokinetic torque ratio of the converter has become reduced. This occurs at a time prior to the operation of the shift valves. Thus the servo does not have excessive capacity at the time the 1–2 shift and the 2–3 shift occur and the quality of the shifts thus is improved. A maximum line pressure is required only when the maximum torque delivery requirements are present. This occurs only when the hydrokinetic torque ratio is at a relatively high value.

The cut-back valve includes the valve spool 358 which is slidably situated within a valve chamber 360. The spool 358 includes valve lands 362 and 364. Land 362 includes a large diameter portion that is greater in diameter than diameter of valve land 364. Thus, a differential area is provided, and this area is subjected to the output throttle pressure of the primary throttle valve 212.

Throttle pressure is distributed to the valve chamber 360 through a throttle pressure passage 366. The valve spool 358 is caused to assume the position shown on the drawings when the vehicle speed is low. Under these conditions, the passage of 366 is brought into direct communication with passage 368 which in turn communicates with the passage 146 and the pressure booster valve 128. The lower end of chamber 360 is exhausted. Governor pressure in passage 200 acts upon the upper end of land 362. When the vehicle speed is sufficiently high, the governor pressure force moves the spool 358 downwardly against the opposing influence of throttle pressure thereby interrupting communication between passage 366 and exhausting passage 368 through the exhaust port 370.

A forced downshift valve 372 is provided for overruling the automatic operation of the shift valves. It includes a valve spool 374 having lands 376 and 378. Spool 374 is slidably situated within a valve chamber 380 and is urged in a left-hand direction by valve spring 382.

The downshift valve is connected mechanically to the engine carburetor throttle valve. When the operator moves the engine carburetor throttle valve toward the wide open position, the throttle linkage will cause the spool 374 to be shifted in a right-hand direction thereby establishing communication between passage 282 and a passage 385, the latter communicating with passage 180, which is pressurized when the manual valve assumes the D1 or D2 positions. At the same time, communication between passage 282 and exhaust passage 386 is interrupted. The output pressure of throttle booster valve 246 then acts directly upon each of the shift valves to urge them toward their respective downshift positions.

Passage 386 communicates with the reverse and low servo which is exhausted during D2 or D1 operation either through exhaust port 330 in the 1-2 shift valve or through exhaust passage 176.

The line pressure coasting boost valve and the valve circuit of my invention avoids, as explained earlier, a reduction in line pressure when the vehicle is coasting at high speed and the engine carburetor throttle is at its minimum setting. Thus the clutch and brake friction elements have adequate capacity to accommodate the coasting torque.

The coasting boost valve includes a valve element 390 which is situated slidably within the valve chamber 392. Element 390 is provided with a pair of spaced valve lands 394 and 396 which register with internal valve lands formed in the valve chamber 392. A valve spring 398 normally urges the valve element 390 in a downward direction as viewed in FIGURE 2b and in FIGURE 3.

Located in the upper end of chamber 392 is a valve sleeve 399 having a central opening within which is slidably positioned a valve plug 397. Governor pressure 200 communicates with the upper end of chamber 392 and distributes governor pressure to the upper end of plug 397, thereby causing the latter to exert a governor pressure force on the valve element 390. This force is supplemented by the force of valve spring 398.

Passage 180, which is pressurized whenever the manual valve assumes the D1 position or the D2 position, communicates directly with the lower end of chamber 392 and distributes regulated line pressure to the lower end of land 395. Line pressure passage 393 communicates with the chamber 392 directly adjacent land 396. Land 395 is formed with a diameter that is less than the diameter of land 396.

Passage 368, which distributes from the cutback valve 356 primary throttle valve pressure, communicates with chamber 392 at a location directly adjacent the land 394. Passage 146 communicates with chamber 392 at a location intermediate lands 396 and 394. When the valve element 390 assumes the position shown in FIGURES 2b and 3, direct communication is established between passage 368 and passage 146. Valve element 390 assumes the position shown whenever passage 180 is pressurized. The influence of the governor pressure in passage 200 does not cause valve element 390 to respond when passage 180 is pressurized.

Line pressure in passage 106 communicates with the chamber 392 at a location directly adjacent land 396, passage 393 being provided for this purpose. Control pressure acts upon the area defined by the differential diameter of lands 396 and 395. This tends to produce a force on the valve element 390 that tends to urge it in an upper direction as viewed in FIGURES 2b and 3. If the vehicle speed is less than the predetermined value, the control pressure will be sufficient at all times to maintain the valve element 390 in the position shown. At high speeds, however, valve element 390 will respond to the influence of governor pressure when the engine throttle is relaxed during coasting with the manual valve in the L position.

Valve chamber 392 during acceleration under torque serves as a connection between passages 146 and 368, thereby allowing primary throttle pressure to pass through the cutback valve and the coasting boost valve at speeds below the threshold speed for the cutback valve. This produces an added force upon the main regulator valve that causes the control pressure to be maintained at the desired pressure level during the acceleration period. When the cutback valve moves in a downward direction, as indicated in FIGURE 2c, under the influence of governor pressure, passage 368 and communicating passage 146 become exhaustive thereby causing a corresponding reduction in the regulated line pressure maintained by the main regulator valve.

During coasting at relatively high speeds with the manual valve in the L position, line pressure in passage 393 is distributed to passage 146 as passage 368 becomes sealed by land 394. An increase in vehicle speed at this time results in further restriction of passage 368 and further opening of passage 393, thereby increasing the amount of the pressure boost. The converse is true as the vehicle speed decreases during coasting. It is apparent, therefore, that the valve 390 is a modulator valve that modulates the pressure in a passage 393 to produce a resultant signal in passage 146 that is proportional to the governor pressure in passage 200.

The 1-2 shift valve and the 2-3 shift valve respond to the vehicle speed pressure signal and the pressure signal on the output side of the throttle booster valve to initiate automatic upshifts during the acceleration period, as explained in the foregoing paragraphs. When the transmission is in the D1 driving range, a 1-2 upshift is accomplished by engaging the intermediate servo as the carrier 80 begins to freewheel. There is no requirement that any of the other friction elements be applied or released. It is desirable, therefore, to cushion the application of the intermediate servo during such a 1-2 upshift in order to improve the 1-2 upshift quality. This is accomplished by means of the 1-2 shift capacity scheduling and accumulator valves which are seen in FIGURE 2a. For purposes of this description, these valves will be separately identified as a modifier valve 402 and a shift regulator valve 404.

The modifier valve comprises a valve chamber 406 within which is slidably position a valve element 408. This element is urged normally in a downward direction, as viewed in the drawings, by a valve spring 410. It includes a large diameter land 412 and a relatively small diameter land 414. Each land is situated within a separate portion of the chamber 406. The lower region of the chamber 406 and the element 408 cooperate to define an accumulator cavity 416. This cavity is in fluid communication with passage 332 which extends, as previously explained, through the 2-3 backout valve to the apply side of the intermediate servo. This servo, as we have seen, is stroked from a release position to the applied position during a 1-2 upshift while the release side of the servo remains exhausted. The pressure in the apply side of the intermediate servo is distributed through passage 332 to the upper end of a valve land 418 for the regulator valve 404. This valve includes a valve element 420, and it includes also, in addition to land 418, the land 422. Element 420 is biased in an upward direction, as viewed in FIGURE 2a, by a valve spring 424.

Valve element 420 is slidably situated within a valve chamber 426, which is formed with internal valve lands that register with the lands 418 and 422. An exhaust port 428 communicates with the chamber 426 at a location adjacent land 418.

Passage 332 communicates with a passage 430 which in turn is in fluid communication with a passage 432 through a flow restricting orifice 434. Passage 430 in turn distibutes the pressure on the downstream side of the orifice 434 to the lower end of land 422 of the regulator valve element 420 and to the lower end of land 412 of the modifier valve element 408.

When the regulator valve element 420 is in the position shown in FIGURE 2a, direct communication is established between passage 328 and passage 430. Passage 328, as explained in the preceding portion of this description, is exhausted through passage 330 when the 1–2 shift valve is in the downshift position. It is pressurized, however, when a 1–2 shift valve moves to the upshift position. Thus, when an upshift occurs following acceleration from a standing start, a pressure build-up tends to occur in passage 430 and in passage 332. This same pressure build-up creates a pressure force acting upon the upper end of land 418. Of course, this same pressure build-up occurs on the lower end of land 422 and on the lower end of land 412.

The upper end of valve chamber 406 is pressurized with the output pressure of the primary throttle valve. Passage 436 is provided for the purpose of distributing valve pressure from passage 144 to the upper region of chamber 406.

The force of spring 410 and the force of the throttle pressure acting upon the modifier valve element 408 tends to oppose movement of the element 408 under the influence of the pressure build-up on the lower end of land 412. When the pressure build-up reaches a value that is sufficient to overcome the combined downwardly directed forces acting upon the element 408, that element will begin to stroke in an upward direction. This causes flow to occur across the orifice 434. This produces a pressure differential, which may be approximately 5 p.s.i. This pressure differential then tends to cause valve element 420 to shift in a downward direction thereby uncovering exhaust port 428 to create a pressure build-up in the passage 432 following movement of the 1–2 shift valve to the upshift position. The action of the servo then is modified so that the pressure build-up occurs at a slower rate than that which would occur if the regulator valve were not present.

As the pressure continues to build up at the slower rate, the pressure in the accumulator chamber 416 also builds up at that same rate. This is accompanied, of course, by a corresponding pressure build-up in passage 432, although the abolute pressure in that passage will be less than the pressure that exists in chamber 416 by reason of the pressure drop across the orifice 434. The valve element 408 then will continue to stroke until it bottoms out against the end of the chamber 406. At that time, flow ceases across the orifice 434 and the pressure in passage 432 becomes equal to the pressure in passage 430. The spring 424 then returns regulator valve element 420 to the position shown in FIGURE 3 thereby closing exhaust port 428. The intermediate servo then will have been engaged fully so that it is capable of transmitting the maximum torque reaction. The shift then is completed.

It is seen from the foregoing description that the servo pressure at which the regulator valve 420 begins to regulate is dependent upon the magnitude of the throttle pressure in passage 436. If a 1–2 upshift occurs when the engine manifold pressure is high, there will take place an immediate pressure build-up to a relatively high value before the regulator valve 420 begins to modify the rate of pressure build-up. During this interval, the intermediate servo gains capacity although it continues slipping since it has not yet achieved its full torque transmitting capacity.

The modifier valve and the associated regulator valve can be calibrated so that the intermediate servo will become fully engaged at all times at a time later than the point at which the regulator valve element 420 begins to regulate but at a time prior to the instant that the modifier valve element 408 becomes bottomed out against the end of the valve chamber 406. Thus the intermediate servo becomes applied at an instant when the rate of pressure build-up on the apply side of the servo is reduced. This occurs regardless of the magnitude of the engine manifold pressure that exists at the time the 1–2 upshift is initiated.

When the vehicle is traveling at a relatively high speed and the vehicle operator shifts the manual valve to the low position, passage 176 becomes pressurized. Passage 184, of course, continues to be pressurized, thereby assuring that the forward clutch will remain applied. Passage 180, however, becomes exhausted through the manual valve, thereby providing an exhaust flow path for the off side of the intermediate servo and the reverse clutch servo.

The pressurized passage 176 will cause a force on the 1–2 shift valve spool 308 by reason of the differential area defined by the differential diameter of the valve lands 314 and 318. This tends to produce a downshifting tendency on the 1–2 shift valve assembly. This downshifting tendency, however, is opposed by governor pressure in passage 200.

If the vehicle speed is sufficient to maintain a governor pressure that is adequate to oppose initially the downshifting tendencies of the 1–2 shift valve, the transmission system will assume an intermediate speed ratio condition. A downshift will occur subsequently, however, as the vehicle speed lessens and as the governor pressure becomes reduced.

The vehicle operator thus normally would tend to have some control over the downshift point at which the speed ratio changes from the intermediate speed ratio to the low speed ratio during coasting. By opening the engine throttle there is then a tendency for the downshifting forces on the 1–2 shift valve assembly to increase. If this occurs while the vehicle is traveling at a speed greater than the preselected speed, an undesirable lurching of the vehicle takes place due to the large inertia forces that are experienced upon a speed ratio shift to the low speed ratio. The forces on the 1–2 shift valve respond to changes in engine throttle setting because of the influence of throttle setting on engine vacuum, which controls the main regulator valve. The main regulator valve in turn controls the line pressure that is made available to the differential area defined by lands 314 and 318 on the 1–2 shift valve assembly.

The coasting boost valve of my invention eliminates this undesirable conditoin by overruling the downshifting tendencies that are obtained during coasting as the vehicle operator advances the engine throttle setting. This occurs since the resulting increase in line pressure caused by an increase in throttle setting acts upon the differential area of the coasting boost valve produced by differential diameter lands 395 and 396. This then tends to reduce the regulated pressure in passage 146. This in turn results in a reduction of the pressure force acting on the differential area defined by lands 138 and 140 of the pressure booster valve. This decrease in the pressure booster valve force compensates for the increase in pressure booster valve force resulting from an increase in primary throttle valve pressure in passage 144. There is a tendency, therefore, for the regulated line pressure to remain the same. This then means that the downshifting tendencies of the 1–2 shift valve resulting from a change in throttle setting remain constant.

The line pressure coasting boost valve assembly is a regulator valve rather than a so-called shuttle valve. It produces a modified pressure in passage 146 which senses the vehicle speed to produce a boost in regulated line pressure that is proportional to speed during coasting operation. At high vehicle speeds, the regulated line pressure in passage 146 is higher than it would be if the speed were reduced because when the vehicle is coasting at high speed the maximum line pressure boost in required. A lesser boost is required, of course, when the torque transmitting capacity of the friction elements decreases upon a decrease in vehicle speed. Thus the load upon upon the front pump is not excessive. Only that demend is put upon the front pump demand which is required to maintain adequate torque transmitting capacity of the friction elements. No excessive demands are imposed upon it. The left of the pump then is increased.

My improved line pressure coasting boost valve increases the minimum regulated line pressure that is obtained during coasting, but it lowers the maximum pressure to that value which is necessary to maintain adequate torque transmitting capacity under any given driving condition.

The coasting boost valve does not function during reverse drive since governor pressure then is exhausted from passage 200. Thus the valve spring 398 maintains the valve element 390 in the inoperative position as shown in FIGURE 2b.

Having thus described a preferred form of my invention, what I claim and desire to secure by U.S. Letters Patent is:

1. A power transmission mechanism for delivering driving torque from a driving member to a driven member comprising a valve system having fluid pressure operated servos adapted to control the relative motion of torque delivery elements of said mechanism thereby establishing speed ratio changes, a line pressure source, conduit structure interconnecting said pressure source and said servos, fluid pressure distributor valve means for controlling selectively the distribution of pressure from said pressure source to said servos, said distributor valve means being disposed in and partly defining the conduit structure, manual valve means communicating with said conduit structure for controlling distribution of pressure from said source to said distributor valve means, said manual valve means upon assuming a low speed ratio position being effective to overrule the normal upshifting tendencies of said distributor valve means, main regulator valve means communicating with said pressure source for maintaining a controlled line pressure in said conduit structure, a source of governor pressure proportional in magnitude to the driven speed of said driven member, and line pressure coasting boost regulator valve means communicating with said governor pressure source and actuated thereby for establishing a modified pressure, said coasting boost regulator valve means communicating with said main regulator valve means whereby the latter establishes an augmented line pressure during coasting operation when said manual valve is in said low speed ratio position, said coasting boost regulator valve means communictaing selectively through said manual valve with a high pressure portion of said conduit structure whereby the regulating action of said coasting boost regulator valve means is overruled once the transmission mechanism is conditioned for operation in a high speed ratio.

2. A control valve system for a power transmission mechanism adapted to deliver driving torque from a driving member to a driven member, fluid pressure operated servos adapted to control relative motion of torque delivery elements of said transmission mechanism, a fluid pressure source, conduit structure interconnecting said servos and said pressure source, a main regulator valve means for establishing a regulated pressure level in said conduit structure, distributor valve means situated in and partly defining said conduit structure for controlling distribution of pressure to each of said servos, said distributor valve means controlling automatic speed ratio changes from high speed ratios to a lower speed ratio and from a low speed ratio to a high speed ratio, manual valve means for controlling distribution of pressure from said source to said distributor valve means, said manual valve means having a low speed ratio position that conditions the distributor valve means for continuous underdrive operation while inhibiting automatic upshifting tendencies, a source of a pressure signal that is proportional in magnitude to the driven speed of said driven member, said distributor valve means being in fluid communication with said speed pressure signal source and actuated by said speed pressure signal, a line pressure coasting boost regulator valve means communicating with said main regulator valve means for distributing a modulated pressure to said main regulator valve means that modifies the latter's pressure regulating characteristics to produce a higher regulated line pressure during coasting operation when said manual valve is moved to said low speed ratio position, said line pressure coasting boost valve means communicating with said speed pressure signal source whereby the modulated pressure made available to the main regulator valve means is varied in magnitude in accordance with changes in the driven speed, and means for distributing a pressure to said coasting boost regulator valve means during high speed ratio operation that overrules its regulating action.

3. An automatic control valve system for a power transmission mechanism adapted to deliver driving torque from a driving member to a driven member, fluid pressure operated servomeans for establishing plural torque delivery paths from said driving member to said driven member, a fluid pressure source, conduit structure connecting said servomeans and said pressure source, a main regulator valve means for maintaining controlled line pressure in said conduit structure, automatic shift valve means for controlling selectively distribution of regulated pressure from said source to said servomeans, a source of a pressure signal that is proportional in magnitude to the driven speed of said driven member, said distributor valve means being in fluid communication with said speed pressure signal source whereby the speed ratio changes are initiated in response to changes in driven speed, a line pressure coasting boost regulator valve means in fluid communication with said main regulator valve means and with said speed pressure source for producing a modified pressure that acts upon said main regulator valve means to augment the magnitude of the line pressure for which it is calibrated, and manual valve means in said conduit structure for distributing to said coasting boost regulator valve means a pressure signal that overrules and renders the latter ineffective upon movement of the former to a position corresponding to high speed ratio operation.

4. The combination as set forth in claim 1 wherein said valve system includes a source of a pressure signal that is proportional in magnitude to engine torque, fluid passage means between said main regulator valve means and said torque signal source whereby said main regulator valve means responnds to changes in engine torque to produce a regulated line pressure that senses engine torque, and a cutback valve means situated in and partly defining said fluid passage, said cutback valve means communicating with said speed pressure source to interrupt communication between said torque signal source and said main regulator valve means when the driven speed of the driven member exceeds a calibrated value, said coasting boost regulator valve means defining in part said fluid passage when it assumes its overruled position.

5. The combination as set forth in claim 2 wherein said valve system includes a source of a pressure signal that is proportional in magnitude to engine torque, fluid passage means between said main regulator valve means and said torque signal source whereby said main regulator valve means responds to changes in engine torque to produce a regulated line pressure that senses engine torque, and a cutback valve means situated in and partly defining said fluid passage, said cutback valve means communicating with said speed pressure source to interrupt communication between said torque signal source and said main regulator valve means when the driven speed of the driven member exceeds a calibrated value, said coasting boost regulator valve means defining in part said fluid passage when it assumes its overruled position.

6. The combination as set forth in claim 3 wherein said valve system includes a source of a pressure signal that is proportional in magnitude to engine torque, fluid passage means between said main regulator valve means and said torque signal source whereby said main regulator valve means responnds to changes in engine torque to produce a regulated line pressure that senses engine torque, and a cutback valve means situated in and partly defining said fluid passage, said cutback valve means communicating with said speed pressure source to interrupt communication between said torque signal source and said main regulator valve means when the driven speed of the driven member exceeds a calibrated value, said coasting boost regulator valve means defining in part said fluid passage when it assumes its overruled position.

7. A control valve system for a power transmission mechanism having a driving member and a driven member, torque delivery elements defining plural torque delivery paths between said driving member and said driven member, fluid pressure operated servos for controlling the relative motion of said torque delivery elements, a fluid control pressure source, conduit structure in fluid communication with said pressure source interconnecting said pressure source and said servos, a main regulator valve means situated in and partly defining said conduit structure for maintaining controlled line pressure in said conduit structure, automatic shift valve means in said conduit structure for controlling distribution of pressure selectively to said servos, a source of a pressure signal that is proportional in magnitude to engine torque and a source of pressure signal that is proportional in magnitude to driven speed, said shift valve means responding to changes in said pressure signals, said main regulator valve means being in fluid communication with said torque signal source, and line pressure coasting boost regulator valve means in said conduit structure for producing a modified pressure output that is distributed through said conduit structure to said main regulator valve means, and manual control valve means in said conduit structure between said fluid pressure source and said shift valve means for distributing control pressure to said shift valve means to overrule the normal upshifting tendencies of said shift valve means after it assumes a low speed ratio position, said coasting boost regulator valve means responding to a tendency for said main regulator valve means to produce a higher line pressure upon an increase in engine torque to produce a reduced regulated pressure feed back to said main regulator valve means thereby opposing the normal tendency of said main regulator valve means to produce a higher regulated pressure upon a change in engine torque demand.

8. The combination as set forth in claim 7 wherein said coasting boost regulator valve means communicates with said speed pressure signal source whereby the former produces a regulater pressure output that is proportional in magnitude to the driven speed of said driven member thereby providing a higher regulated line pressure during coasting operation at high speeds relative to the corresponding pressure that is obtained during coasting at low speeds.

9. The combination as set forth in claim 7 wherein said valve system comprises a fluid passage between said main regulator valve means and said torque signal source whereby said torque signal acts upon said main regulator valve means to produce an augmented line pressure upon an increase in engine torque, and a cutback valve means in said fluid passage for interrupting said fluid passage upon an increase in said driven speed, said cutback valve means communicating with said speed pressure signal source.

10. The combination as set forth in claim 8 wherein said valve system comprises a fluid passage between said main regulator valve means and said torque signal source whereby said torque signal acts upon said main regulator valve means to produce an augmented line pressure upon an increase in engine torque, and a cutback valve means in said fluid passage for interrupting said fluid passage upon an increase in said driven speed, said cutback valve means communicating with said speed pressure signal source.

References Cited

UNITED STATES PATENTS

| 2,893,261 | 7/1959 | Flinn | 74—472 |
|---|---|---|---|
| 3,003,368 | 10/1961 | Winchell | 74—752 |
| 3,056,313 | 10/1962 | Lindsay | 74—752 |
| 3,083,589 | 4/1963 | Knowles et al. | 74—472 X |
| 3,167,970 | 2/1965 | Wagner et al. | 74—472 |

FRED C. MATTERN, Jr., *Primary Examiner.*

THOMAS C. PERRY, *Assistant Examiner.*